United States Patent [19]
Hardison

[11] Patent Number: 5,286,389
[45] Date of Patent: Feb. 15, 1994

[54] REMOVAL OF HYDROGEN SULFIDE FROM SOUR WATER

[75] Inventor: Leslie C. Hardison, Barrington, Ill.

[73] Assignee: ARI Technologies, Inc., Schaumburg, Ill.

[21] Appl. No.: 934,571

[22] Filed: Aug. 24, 1992

Related U.S. Application Data

[60] Continuation-in-part of Ser. No. 873,713, Apr. 22, 1992, abandoned, which is a continuation of Ser. No. 464,730, Jan. 16, 1990, abandoned, which is a continuation of Ser. No. 246,191, Sep. 19, 1988, abandoned, which is a division of Ser. No. 20,568, Mar. 2, 1987, Pat. No. 4,784,775.

[51] Int. Cl.$^5$ .............................................. C02F 1/74
[52] U.S. Cl. .................. 210/712; 60/641.2; 210/718; 210/721; 210/750; 210/763; 423/573.1
[58] Field of Search ............. 60/641.2; 210/712, 718, 210/721, 750, 752, 763, 765, 916; 423/224, 571, 573.1

[56] References Cited

U.S. PATENT DOCUMENTS

| | | | |
|---|---|---|---|
| 4,076,621 | 2/1978 | Hardison | 210/60 |
| 4,224,151 | 9/1980 | Jost | 423/224 |
| 4,363,215 | 12/1982 | Sharp | 60/641.2 |
| 4,414,817 | 11/1983 | Jernigan | 60/641.2 |
| 4,446,031 | 5/1984 | List | 210/916 |
| 4,451,442 | 5/1984 | Jeffrey et al. | 423/224 |
| 4,468,929 | 9/1984 | Jernigan | 60/641.2 |
| 4,614,644 | 9/1986 | Lampton, Jr. et al. | 423/226 |
| 4,629,608 | 12/1986 | Lampton, Jr. et al. | 423/226 |
| 4,696,802 | 9/1987 | Bedell | 210/763 |
| 4,784,775 | 11/1988 | Hardison | 210/712 |
| 5,126,118 | 6/1992 | Hardison | 423/573.1 |

Primary Examiner—Peter A. Hruskoci
Attorney, Agent, or Firm—Allegretti & Witcoff, Ltd.

[57] ABSTRACT

Sour water is treated to remove dissolved hydrogen sulfide by means of an aqueous, non-chelated polyvalent metal solution in a continuous recirculating system, particularly an autocirculation system, having reaction and oxygenation zones. The solution contains a small catalytic amount of polyvalent metal, e.g., ferrous or ferric iron salts, and the dissolved hydrogen sulfide is oxidized to sulfur in the liquid phase, without chelating agent solution, by means of dissolved oxygen in the solution. The sour water feed to the reaction zone is diluted by a massive recycle of oxygenated solution from the oxygenation zone before the sour water is contacted with air or other oxidizing gas used for oxygenating the used solution. A portion of the oxygenated solution containing polyvalent metal, without added chelating agent, is removed as the sweet water product, and replacement polyvalent metal is added. The operating variables are controlled to maintain in the solution a predetermined polyvalent metal content and an effective dissolved oxygen content, and also to maintain a predetermined residence time so as to obtain high efficiency of hydrogen sulfide removal.

12 Claims, 2 Drawing Sheets

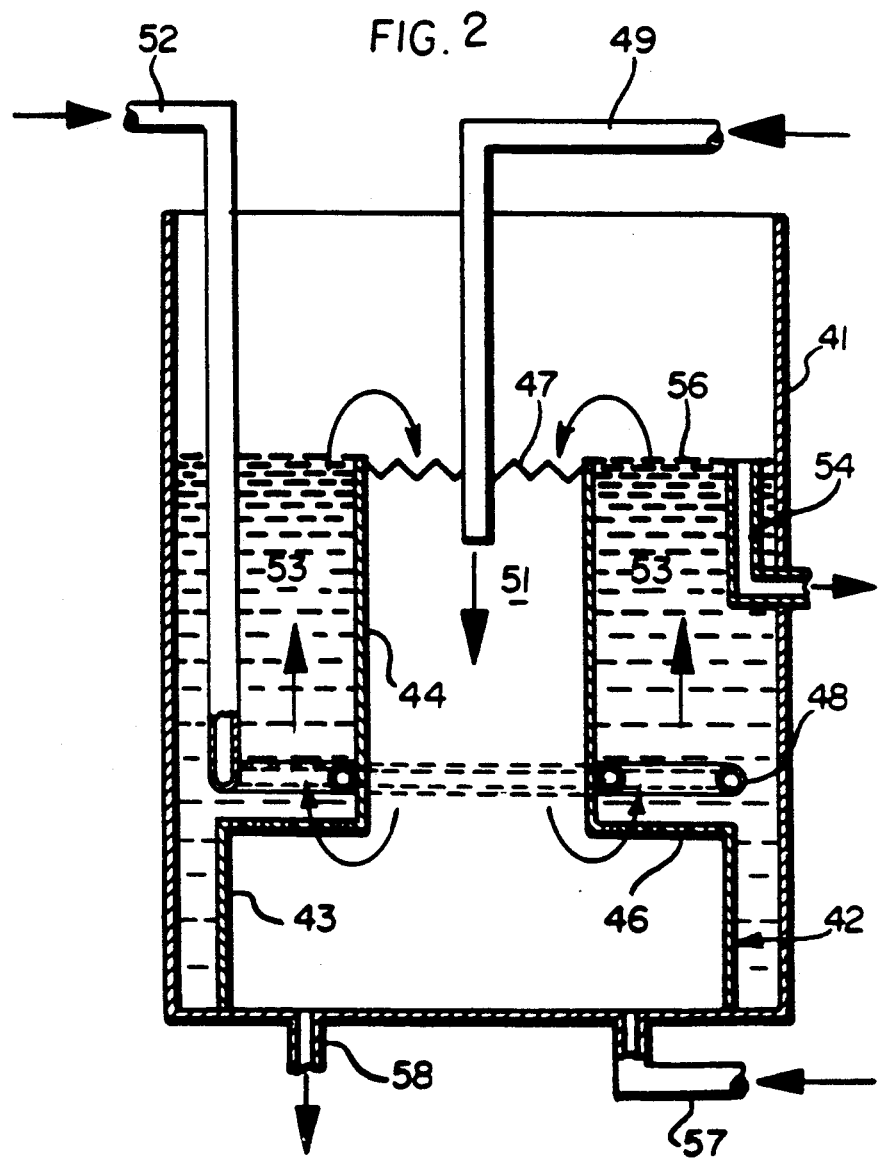

REMOVAL OF HYDROGEN SULFIDE FROM SOUR WATER

CROSS REFERENCE TO RELATED APPLICATIONS

This application is a continuation-in-part of copending application Ser. No. 07/873,713, filed Apr. 22, 1992, now abandoned which is a continuation of application Ser. No. 07/464,730, filed Jan. 16, 1990, now abandoned, which is a continuation of application Ser. No. 07/246,191, filed Sep. 19, 1988, now abandoned, which is a divisional of application Ser. No. 07/020,568, filed Mar. 2, 1987, now U.S. Pat. No. 4,784,775.

FIELD OF THE INVENTION

This invention relates to a novel and improved process and apparatus for the treatment of so-called "sour water" to remove dissolved hydrogen sulfide and is an improvement over the process and apparatus disclosed in U.S. Pat. No. 4,784,775. More particularly, the present invention is directed to a process and apparatus for the removal of hydrogen sulfide from "sour water" by the addition of ferrous iron salts and/or ferric iron salts, without a chelating agent.

BACKGROUND OF THE INVENTION

Industrial waste water containing dissolved hydrogen sulfide presents a significant pollution problem because of its high toxicity and unpleasant odor even at low concentrations. The treatment of such waste water is necessary before discharging it to the environment to reduce the hydrogen sulfide content to acceptable levels. The present invention provides a simple and effective method of removing of hydrogen sulfide from such waste water streams by the addition of non-chelated ferrous and/or ferric iron salts.

Typical sour water streams are those produced in oil refineries by water washing of sour liquid hydrocarbons and various cooler and condenser surfaces. Condensation of geothermal steam also produces sour water which requires treatment. Although the present invention may be used for the treatment of any sour water stream regardless of its source, the invention is of particular significance for treating geothermal condensates.

In a geothermal power plant geothermal steam is used to power a steam turbine which is connected to an electric power generator. The exhaust steam from the turbine is supplied to a condenser, and the resultant steam condensate is removed for reuse or discard. Geothermal steam, however, contains dissolved hydrogen sulfide in amounts which may range, for example, from as low as about 5 ppm to as high as about 1600 ppm and typically may average about 150 to 250 ppm. Dependent upon the type of condenser and its efficiency, a significant percentage, e.g., as much as 80%, of the hydrogen sulfide in the geothermal steam will end up as dissolved hydrogen sulfide in the condensate. This sour water stream must be treated to remove hydrogen sulfide in order to avoid environmental pollution.

U.S. Pat. No. 4,076,621 discloses a process for removing hydrogen sulfide from sour water by air stripping the dissolved hydrogen sulfide from the sour water and then scrubbing the air stream with an aqueous solution of chelated iron. U.S. Pat. Nos. 4,414,817; 4,451,442; and 4,468,929 disclose processes for removing hydrogen sulfide from geothermal steam or condensate using an aqueous solution containing at least the stoichiometric amount of a chelated polyvalent metal. U.S. Pat. No. 4,363,215 discloses a process for removing hydrogen sulfide from geothermal steam condensate using hydrogen peroxide and an iron chelate catalyst. U.S. Pat. Nos. 4,614,644 and 4,629,608 disclose processes for removing hydrogen sulfide from geothermal steam using a chelated iron solution and a cationic polymeric catalyst.

However, the known sour water treatment processes that rely on the use of chelated polyvalent metal solutions are complex and have other disadvantages, such as excessive consumption or discard of expensive chelating agent.

SUMMARY OF THE INVENTION

In brief, it has been found, in accordance with the present invention, that small concentrations of dissolved hydrogen sulfide, e.g., about 5 ppm to about 500 ppm dissolved hydrogen sulfide, can be removed from an aqueous solution without the addition of a chelating agent, by the addition of a non-chelated ferrous iron salt and/or non-chelated ferric iron salt so long as the sour water is immediately contacted with recycle water having a relatively high dissolved oxygen content, for example, about 4 ppm oxygen and a relatively low $HS^-$ content, e.g., below about 5 ppm, preferably about 1 ppm $HS^-$ or less.

This invention utilizes a continuous recirculating system having a reaction zone and an oxygenation or reoxidation zone. The sour water containing dissolved hydrogen sulfide is fed to the reaction zone and is immediately mixed and diluted with a freshly oxygenated aqueous iron catalyst solution of a non-chelated ferrous and/or ferric iron salt that contains dissolved oxygen and has a predetermined relatively low iron concentration that is below the stoichiometric requirement for oxidation of all of the contacted hydrogen sulfide by ferric iron. The dissolved oxygen in the oxygenated catalyst solution is relied upon as the primary oxidant for hydrogen sulfide, and the non-chelated iron functions primarily as a catalyst for the oxidation reaction. In order to effectively achieve the oxidation reaction without an iron chelating agent, the $HS^-$ content of the highly oxygenated aqueous catalyst solution should be below about 5 ppm $HS^-$ by weight. Thereafter, the liquid mixture passes from the reaction zone to the oxygenation zone and is there contacted with air or other oxygen-containing gas.

The combined liquid mixture of catalyst solution and sour water is retained in the system for a relatively long residence time that is correlated with the ferrous and/or ferric iron concentration, to effect substantially complete liquid phase catalytic oxidation of the dissolved hydrogen sulfide by the dissolved oxygen without requiring an iron chelating agent. The required residence time increases as the iron concentration decreases, and vice versa.

In the oxygenation zone, air or other oxygen-containing gas is bubbled through the liquid mixture to infuse the mixture with dissolved oxygen to a concentration of at least 1 ppm by weight, and preferably a higher concentration up to 6 or 7 ppm, the normal equilibrium limit in contact with air at atmospheric pressure. A major portion of this liquid mixture is recirculated from the oxygenation zone to the reaction zone and there mixes with and dilutes the incoming sour water feed. The sour water feed is introduced into the system in a manner such that it is not contacted by air or gaseous oxygen until after it has been diluted with the highly oxygenated, high HS⁻ content recycle ferrous and/or ferric iron stream from the oxygenation zone and has passed through the reaction zone. Thus, the oxidation of dissolved hydrogen sulfide by dissolved oxygen in the reaction zone occurs entirely in the liquid phase without contact of the liquid with air or gaseous oxygen or other stripping gas capable of stripping the dissolved hydrogen sulfide from the sour water, as taught in U.S. Pat. No. 4,076,621.

A minor portion of the liquid mixture is withdrawn from the oxygenation zone as the sweet water product of the process. Since this product contains ferrous and/or ferric iron salts in solution, fresh or replacement non-chelated iron must be added to the system to maintain the desired iron concentration. Because of the relatively low concentration of the iron, on the order of about 0.5 ppm to about 15 ppm by weight, and because chelating agent is not required, the cost of the iron salts lost in the sweet water product is minimal so that the process is economically feasible.

The sour water feed rate, the recirculation rate, the product withdrawal rate, the rate of addition of replacement iron salt(s), and the sizes of the reaction zone and the oxygenation zone are correlated to maintain the desired iron concentration, the desired dilution of sour water feed, and the desired residence time, as explained in more detail in the following detailed description.

Accordingly, one aspect of the present invention is to provide a novel and improved process and apparatus for the treatment of sour water which has important advantages over the processes and systems heretofore proposed.

Another object of the invention is to provide a process and apparatus of the foregoing character which utilize an aqueous ferrous iron salt solution and/or ferric iron salt solution or other polyvalent metal, without a chelating agent, in a novel and improved manner such that the cost of the iron salts is substantially reduced due to the fact that the process operates efficiently without a polyvalent metal, e.g., iron chelating agent.

BRIEF DESCRIPTION OF THE DRAWINGS

FIG. 2 is a schematic illustration of an experimental apparatus used for evaluating the invention.

DESCRIPTION OF THE PREFERRED EMBODIMENT

Figure 1:
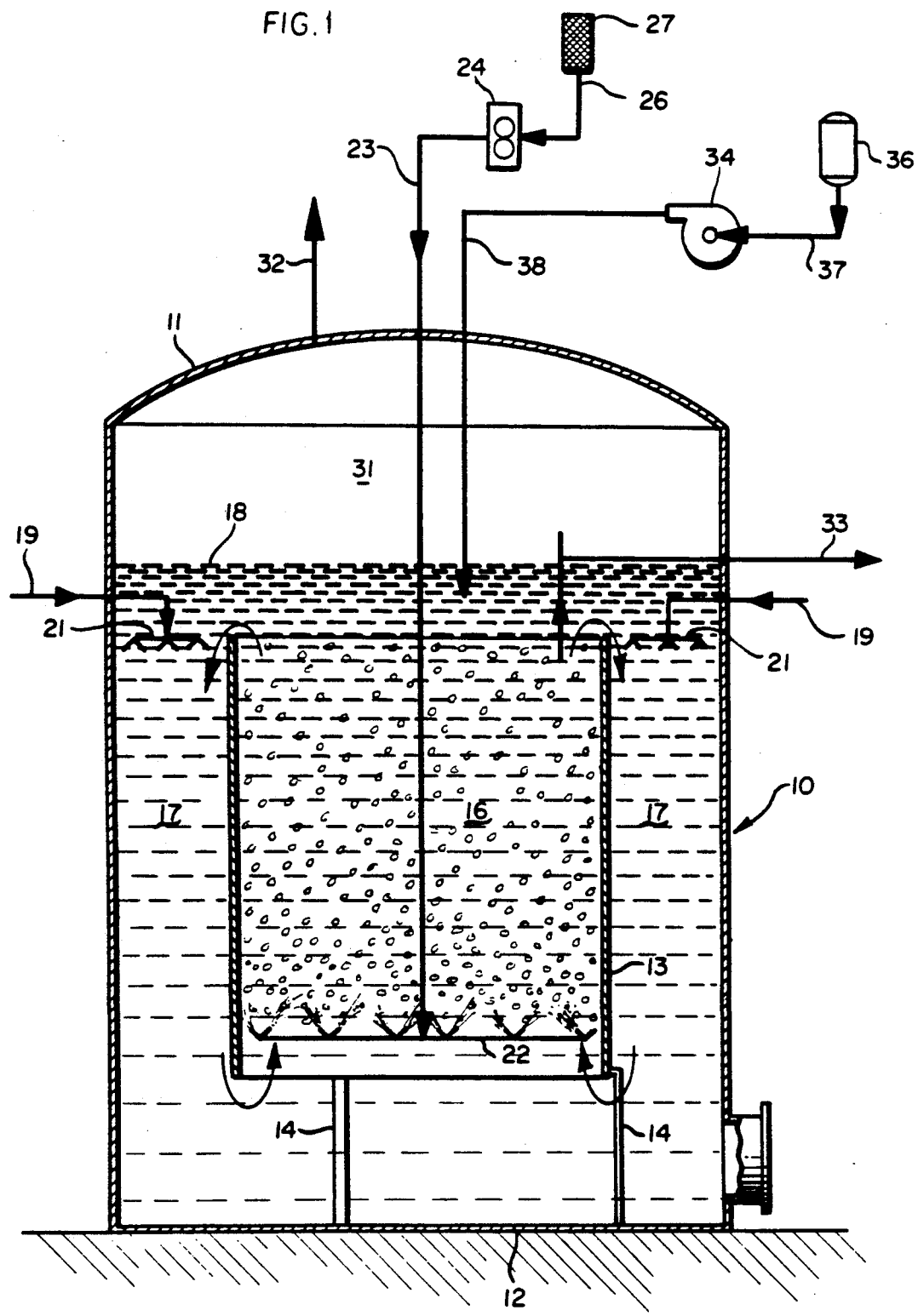
FIG. 1 is a schematic flow sheet illustrating one specific embodiment of an apparatus for practicing the invention.

The system illustrated in FIG. 1 utilizes the autocirculation principle described in U.S. Pat. Nos. 4,238,462 and 4,784,775, which are incorporated herein by reference. In an autocirculation system, separate but contiguous fluid contacting zones are provided within a single or common liquid-containing vessel and these zones are in open or unobstructed fluid communication so as to permit automatic recirculation of liquid between the zones by reason of a density difference between the liquids in the respective zones. The invention is not limited to the use of the autocirculation principle and may also be practiced by pumping the recirculating liquid through interconnecting pipes between separate vessels. The method of the present invention however, requires the recirculation of a very large volume of liquid from the oxygenation zone to the reaction zone for diluting the sour water feed. Consequently, the use of the autocirculation principle is particularly advantageous in order to eliminate the large pumping costs that would be associated with other recirculating systems.

As illustrated in FIG. 1, one embodiment of the autocirculation system comprises an upright cylindrical vessel 10 having a top wall 11 and a flat bottom wall 12. An upright tubular partition or centerwell 13 is supported within the vessel 10 by a plurality of rackets 14 extending between the lower end of the centerwell 13 and the bottom wall of 12 of the vessel 10. As shown in FIG. 1 , the centerwell 13 is disposed concentrically within the vessel 10 and has its upper and lower ends spaced from the vessel top wall 11 and bottom wall 12, respectively. The space within the centerwell 13 comprises an oxygenation zone 16, and the annular space between the centerwell 13 and the side wall of the vessel 10 comprises a reaction zone 17. Alternatively, a plurality of partitions or centerwells may be disposed throughout the vessel 10 in order to maintain a relatively uniform flow distribution.

As indicated by the dashed liquid level line 18, the vessel 10 contains a recirculating liquid mixture comprising a dilute aqueous catalyst solution of a non-chelated polyvalent metal, such as a ferrous iron salt or a ferric iron salt. The reaction zone 17 and the oxygenation zone 16 are each open at their upper and lower ends, and the liquid level 18 is above the upper end of the centerwell 13 so that the respective upper ends of the reaction and oxygenation zones are in open or unobstructed fluid communication, and the same is true for the respective lower ends of the two zones.

Sour water feed, such as geothermal condensate, containing dissolved hydrogen sulfide is fed through a supply line (not shown) and a plurality of branch lines 19 to a ring header or liquid distributor 21 that is positioned at or closely adjacent the upper inlet end of the reaction zone 17. The branch lines 19 are arranged symmetrically so that the sour water feed is distributed evenly over the entire annular reaction zone 17. A sparger ring 22 is positioned adjacent the lower inlet end of the oxygenation zone 16 and is supplied with air at a controlled rate through a line 23 connected to a blower 24 having an inlet line 26 with a filter 27.

As indicated schematically in FIG. 1, the air bubbles upwardly through the liquid in the oxygenation zone 16 so as to effect an increase in the dissolved oxygen content of the iron solution. The size or volume of the oxygenation zone 16 is large enough to insure that the oxygenated liquid contains sufficient dissolved oxygen to accomplish the desired oxidation of dissolved hydrogen sulfide in the reaction zone while also preventing over-reduction of the ferrous and/or ferric iron catalyst, as explained below.

The flow rate of air into the oxygenation zone is high enough so that the density of the air-laden liquid mixture in the oxygenation zone 16 is substantially less than the density of the gas-free liquid mixture in the annular reaction zone 17. As shown by the arrows in FIG. 1, the higher density liquid mixture flows downwardly through the reaction zone 17, and the lower density liquid-gas mixture flows upwardly through the oxygenation zone 16, thereby providing an automatic recirculation system that does not require the use of pumps or the like. At the upper portion of the oxygenation zone 16 the oxygenated liquid overflows the upper end of the centerwell 13 and immediately mixes with and dilutes the sour water feed from the distributors 21 for downward flow through the reaction zone 17. Excess air is released from the oxygenated liquid and collects in the freeboard space, designated at 31, in the upper end of the vessel 10 between the top wall 11 and the liquid level 18. This excess air which is substantially free of hydrogen sulfide and has a slightly diminished oxygen content is discharged through a vent line 32. A minor portion of the oxygenated liquid mixture is removed from the regeneration zone 16 through an overflow line or conduit 33 located at the liquid level 18 and extending downwardly into the upper end of the oxygenation zone 16 to insure that the sour water feed does not bypass the system. Substantially the balance, or major portion, of the oxygenated liquid is recirculated within the system, as previously described. The oxygenated liquid withdrawn through the line 33 constitutes the sweet water product of the process. This product contains a low concentration of dissolved non-chelated iron salt(s) which is nontoxic and environmentally acceptable so that the product may be discarded if desired. In the case of geothermal condensate, the sweet water product may be supplied to a cooling tower and introduced into the cooling water circuit for the geothermal steam condensers, or it may be reinjected into the geothermal formation by means of disposal wells.

In order to replace the iron lost from the system in the product removed through the line 33, replacement iron, preferably as a concentrate, is introduced into the system at any desired point. In FIG. 1, the means for introducing replacement iron comprises a catalyst metering pump 34 that withdraws iron salt solution from a storage tank 36 through a suction line 37 and discharges the replacement iron at a controlled rate through a line 38 extending through the top wall 11 of the vessel 10 and terinating below the liquid level 18 adjacent the upper outlet and of the regeneration zone 16 so that the concentrate is rapidly mixed with the recirculating liquid that overflows the upper end of the centerwell 13.

Elemental sulfur is formed during the oxidation reaction in the reaction zone 17, and fine sulfur particles, e.g., in the 0.1 to 5 μm range, are retained in the recirculating liquid mixture as a colloidal suspension and are removed continuously in the sweet water product withdrawn through the line 33. Optionally, if sulfur recovery is desirable, the product stream, or other stream withdrawn from the vessel 10, may be filtered or settled for sulfur removal. For example, a separate sulfur settler (not shown) may be connected to the vessel 10, and a side stream of sulfur-containing liquid may be supplied to the settler. In the settler, the sulfur particles are allowed to agglomerate to a large particle size, typically in the 10-20 μm range, which settle into a cone-shaped bottom portion of the settler to form a 10-20 wt. % slurry. The slurry may then be passed through a heater or heat exchanger so as to melt the sulfur. The mixture of aqueous catalyst solution and molten sulfur is then introduced into a separator from which the molten sulfur phase is withdrawn to a storage pit.

Prior to entry of the sour water feed into the system, the dissolved hydrogen sulfide has ionized to form bisulfide ions and sulfide ions, as represented by the following question:

In the reaction zone 17 the principal reaction is the oxidation of the sulfide ions to elemental sulfur by the dissolved oxygen supplied in the freshly oxygenated iron solution that is recirculated to the reaction zone, as represented by the following equation:

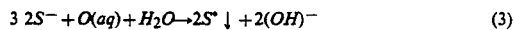

Although the iron is present at a very low concentration, which is much less than the stoichiometric requirement for oxidizing sulfide ion, nevertheless, the sulfide ions also react selectively with ferric ions in the reaction zone to form sulfur according to the following equation:

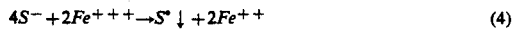

Thus, during the sulfide oxidation reaction, the atoms of ferric iron are reduced from a higher valence state (ferric) to a lower valence state (ferrous), but also they are almost immediately reoxidized to the higher valence state by reaction with the dissolved oxygen in the solution, as illustrated in the following equation:

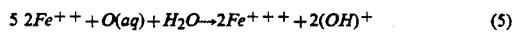

As a result, the iron in the solution in the reaction zone maintains an average state of partial reduction while the dissolved oxygen concentration of the solution is gradually reduced as the solution passes through the reacrion zone.

In addition, the dissolved oxygen in the liquid mixture i the reaction zone 17 may also react to some extent with bisulfide ions to form thiosulfate and sulfate products in accordance with the following equations:

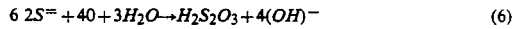

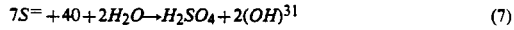

The thiosulfate and sulfate compounds are water-soluble and are removed from the system in the sweet water product withdrawn through line 33. At the relatively low concentrations of dissolved hydrogen sulfide typically found in sour geothermal condensate, the reactions forming thiosulfate and sulfate do not cause any significant reduction in the pH of the solution so that it is usually unnecessary to add a buffer or other alkaline material for pH control. However, suitable additions for maintaining an alkaline pH may be made when necessary.

As explained above, the liquid mixtures exiting downwardly from the reaction zone 17 and flowing upwardly in the oxygenation zone 16 contain iron that is intermediate in valence between the ferrous or reduced state and the ferric or oxidized state. When this liquid is contacted concurrently with air in the oxygenation zone 16, oxygen is absorbed or dissolved in the liquid and the oxidation state of the iron is increased as some of the ferrous ions are oxidized to the ferric state in the same manner shown by equation (5). The spent air, with a small fraction of the oxygen removed, is discharged from the top of the vessel 10, as previously described.

There are several operating requirements that should be satisfied in the system described above in order to provide a process which has a high hydrogen sulfide removal efficiency and is also economically feasible.

As set forth in U.S. Pat. No. 4,784,775, chelated iron solutions have a limited ability to prevent precipitation of ferrous sulfide in accordance with the following equation:

$$8S^= + Fe^{++} \rightarrow FeS \qquad (8)$$

In accordance with the present invention, it has been found that the precipitation of ferrous sulfide, as in equation (8), is prevented without including a chelating agent so long as the oxygen content of the freshly oxygenated iron solution is maintained at a level of at least 1 ppm and preferably above 5 ppm and the dissolved $HS^-$ concentration is at a level of no higher than about 5 ppm, preferably about 1 ppm or below. Otherwise, ferrous sulfide precipitation will occur and it will be difficult or impossible to maintain the desired effective dissolved iron concentration at a reasonable cost.

The desired excess of dissolved oxygen plus low $HS^-$ concentration in the solution first contacting the sour water feed could be maintained by utilizing an iron solution having a relatively high concentration of iron. However, the use of such a high concentration of iron would result in the loss of excessive amounts of iron in the sweet water product removed from the system through line 33, and for economic reasons such loss must be avoided. The present invention meets the foregoing requirements by utilizing in the reaction zone a very dilute aqueous solution containing one or more water-soluble iron salts and by recirculating a massive quantity of oxygenated iron solution from the oxygenation zone to the reaction zone, which dilutes the dissolved hydrogen sulfide content of the incoming sour water feed to a level below about 5 ppm, and preferably about 1 ppm by weight, and at the same time furnishes more than the required amount of dissolved oxygen. In this manner, the concentration of iron in the system is always low enough so that the cost of the iron lost in the removed product stream is minimal. At the same time, the mixing of the sour water feed with a large excess of oxygenated iron solution from the oxygenation zone insures that the dissolved oxygen content of the solution is always high enough relative to the dissolved sulfide ion concentration to maintain the iron in an intermediate state between fully oxidized ferric iron and reduced ferrous iron, thereby preventing the formation of ferrous sulfide by over-reduction of the iron.

In general, the liquid mixture in the reaction zone 17 should contain a low concentration of dissolved ferrous or ferric iron salts, within the range of from about 0.5 ppm to about 15 ppm by weight, and preferably from about 1 ppm to about 3 ppm by weight. Because iron is lost from the system, principally in the sweet water product withdrawn at line 33, the desired iron concentration within the aforementioned range is maintained by correlating the rate of introduction by replacement iron through line 38 with the rate of removal of sweet water product through line 33 so as to compensate for the loss of iron from the system.

The rate of recirculation of oxygenated liquid mixture from the oxygenation zone to the reaction zone is controlled in relation to the dissolved oxygen and iron content of the liquid and in relation to the sour water feed rate so as to ensure oxygen in the reaction zone 17 and a very low iron concentration, less than about 15 ppm. With a hydrogen sulfide content of from about 10 ppm to about 1000 ppm in the sour water feed, a dissolved oxygen content in the oxygenated solution of from about 1 ppm to about 5 ppm, and an iron concentration in the solution of from about 0.5 ppm to about 15 ppm, it will ordinarily be desirable to maintain a volumetric recirculation rate of from about 2.5 to about 1000 volumes of recycled oxygenated solution per volume of sour water feed.

Another operating requirement of the present invention is that the sour water must be introduced into the system in such a way that it is not contacted with air or gaseous oxygen until after it has been diluted with a massive amount of recirculated solution from the oxygenation zone and has passed through the reaction zone. As seen in FIG. 1, the sour water feed distributors 21 are located in the annular inlet area of the reaction zone 17 so that the sour water feed is introduced only into a nonaerated portion of the recirculating liquid and is immediately diluted with freshly oxygenated catalyst solution overflowing the centerwell 13. The recirculated liquid from the oxygenation zone contains both the dissolved oxygen required for the oxidation of the dissolved hydrogen sulfide in the sour water feed and the dissolved iron, as ferrous and/or ferric iron necessary to bring about the reaction. Furthermore, since both the sour water feed and the solution recycled from the oxygenation zone are essentially free of entrained air or other entrained gas, the hydrogen sulfide oxidation reaction in the reaction zone 17 is effected substantially entirely in liquid phase without contact with air or other oxygen-containing gas and without contact with a stripping gas capable of stripping dissolved hydrogen sulfide from the liquid, as is required in the system disclosed in U.S. Pat. No. 4,076,621.

The dissolved oxygen supplied in the oxygenated iron solution must be at least the stoichiometric amount for oxidation of sulfide ion so as to effect substantially complete oxidation of the dissolved hydrogen sulfide in the sour water feed introduced into the reaction zone. In general, a hydrogen sulfide removal efficiency of at least about 90% is desirable, preferably at least about 95%. Ordinarily, the introduction of air into the liquid in the oxygenation zone 16 at a rate sufficient to lower the density of the liquid enough to obtain automatic recirculation will also insure that the oxygenated liquid stream contains the required amount of dissolved oxygen, e.g., from about 1 ppm to about 5 ppm.

In the known gas-liquid contact processes for removing hydrogen sulfide from a gas stream using an aqueous solution of chelated polyvalent metal, e.g., iron, the chelated metal functions both as a reagent and as a catalyst, and the critical variable of the process is the ratio of ferric ion to sulfide ion which must be greater than about 2:1. The present invention, however, utilizes a homogeneous liquid-liquid contact system in which oxidation of dissolved hydrogen sulfide is conducted entirely in the liquid phase relying on dissolved oxygen as the oxidizing agent. In accordance with the present invention, the sulfide ions in the sour water feed are substantially completely oxidized to sulfur in the reaction zone. Any slight amount of sulfide ion that may remain in the solution leaving the reaction zone is eliminated in the oxygenation zone and does not cause any serious problem.

An additional important operating requirement of the present invention is the necessity of providing a relatively long residence time for the liquid phase oxidation of sulfide ion. In the prior art, gas-liquid contact processes for removing hydrogen sulfide from gas steams using an aqueous iron solution at relatively high iron concentrations has required the use of expensive chelating agent. Further, most prior art processes are such that the hydrogen sulfide oxidation reaction rate is extremely rapid and is dependent almost entirely upon the rate of mass transfer from the gas phase to the liquid phase. In the present invention, however, the iron acts primarily as a catalyst at very low concentrations in a liquid phase system without the necessity for chelating agent, and it is necessary to provide a relatively prolonged residence time in order to insure substantially complete removal of hydrogen sulfide.

As a practical matter, it is convenient to define residence time as the system volume, i.e., the combined volume of the reaction zone and the oxygenation zone, divided by the volume flow rate of the sour water feed. At steady state operation, the sweet water withdrawn will be slightly less than the sour water entering the unit because the amount of water evaporated due to the heat generated by the sulfur oxidation reaction is greater than the amount of water produced by the reaction. Accordingly, residence time is controlled by regulating the sour water feed rate, and a corresponding sweet water withdrawal rate is obtained automatically by reason of the overflow product withdrawal arrangement. On this basis, the present invention utilizes a residence time of the sour water in the system selected from the range of from about 5 to about 360 minutes, particularly from about 15 to about 45 minutes, in order to obtain at least about 90% removal of hydrogen sulfide and preferably at least about 95%.

The vessel 10 is designed so that the sizes or volumes of the reaction zone 17 and the oxygenation zone 16 are large enough to accommodate the desired range of residence times without excessive or impractical liquid velocities in these zones. In practice, the reaction zone and the oxygenation zone will usually have approximately equal volumes so that the reaction time or contact time between the sour water feed and the catalyst solution in the reaction zone 17 will be approximately half of the residence time, as defined above. The sour water feed rate, and thus the residence time, is correlated with the sulfide content of the sour water feed in order to obtain a desired low residual sulfide content in the sweet water product. Thus, for a given system of fixed volume, if the sour water feed rate is increased, the residence time will be lowered resulting in a higher sulfide content in the product, and vice versa. In general, the system will be designed so that when operating at the design sour water feed rate, sulfur ions are removed from the entire solution volume, by oxidation, at a rate equal to the rate they come in with the sour water minus the rate the sulfur ions leave with the sweet water. The sulfur content of the feed is reduced to the outlet concentration immediately by dilution. For example, by lowering the feed rate, and thereby increasing the residence time, the sulfide content of the product can be reduced to a desired extent below the maximum permissible level.

Although the invention is described herein with particular emphasis on the use of iron as the polyvalent metal of choice, other polyvalent metals, e.g., vanadium, such as used in the Stretford process, can also be used. Other useful polyvalent metals include copper, cobalt, manganese, and nickel.

The iron catalyst solution used in the present invention is preferably prepared by dissolving a suitable iron salt in water to provide a concentrate capable of dilution to a concentration of about 0.5 ppm to about 15 ppm. The pH of the concentrate may be acidic, alkaline, or neutral, depending upon the properties of the sour water being treated. The pH of the concentrate may be adjusted, if desired, by adding the required amount of an alkaline material or acidic material. pH levels of about 6 to about 9 have been found to work well, whereas oxidation has been difficult at pH levels above about 9.5. An appropriate amount of the concentrate can be diluted with water as required to obtain the desired amount of initial operating solution having the desired iron content. The replacement iron added to the system through line 38 is preferably the concentrate.

The contacting of the sour water feed with the operating solution in the reaction zone 17 may be carried out at ambient conditions of temperature and pressure, but temperatures of from about 5° to about 65° C. and pressures ranging from subatmospheric to 100 atmospheres or greater can be used. For pressures greater than atmospheric pressure, higher dissolved oxygen concentrations can be obtained, in proportion to the absolute pressure. This may allow substantial reductions in the residence time required, or in the concentration of iron required, or a combination of the two. An alkaline or substantially alkaline pH ranging from about 6 to about 13, particularly from about 6 to about 9, is maintained by adding alkaline or acidic material if and as required. The redox potential of the solution is used as a measure of catalyst activity as reflected by the ratio of ferric to ferrous ions in solution. Maintaining a redox potential of from about $-50$ to about $-200$, as measured by a calomel electrode, at the outlet end of the reaction zone 17, is desired.

The following specific examples are presented to illustrate the invention but are not to be construed as limiting the scope of the invention.

EXAMPLE I

An autocirculation pilot plant is used to simulate the treatment of sour water with an aqueous catalyst solution of iron. As shown schematically in FIG. 2, the pilot plant consists of a 55-gallon drum 41 having a centrally located circular partition or insert 42 supported on the bottom wall of the drum. The insert 42 has a large diameter lower portion 43 and an integrally connected upper portion 44 of small diameter. A perforated annular wall 46 interconnects the portions 43 and 44. The upper end of the portion 44 is provided with a sawtooth edge 47. A perforated sparger ring 48 is positioned in the drum 41 closely overlying the perforated wall 46.

During operation of the pilot plant, sour water is fed into the interior of the insert portion 44 by means of an inlet line 49 terminating below the sawtooth edge 47. The interior of the insert portion 44 defines a reaction zone designated at 51. Oxidizing air is fed to the sparger ring 48 by an inlet pipe 52 so as to bubble air upwardly through the liquid contained in the drum in the annular space 53 defined between the insert portion 44 and the wall of the drum 41. This annular space 53 comprises the oxygenation zone. Treated sour water is removed from the drum by means of an overflow pipe 54 having its inlet end positioned at approximately the height of the liquid level within the drum, as indicated at 56. Replacement catalyst solution is supplied to the drum through a pipe 57 connected to the bottom wall of the drum 41 and communicating with the interior of the insert portion 43. A drain pipe 58 is also connected to the bottom wall of the drum 41 at a remote location from the pipe 57 for removal of sulfur slurry. Autocirculation of the liquid in the system is established, as shown by the arrows, by upward flow of the aerated liquid in the oxygenation zone 53 and over the sawtooth edge 47 for dilution of the incoming sour water feed through line 49, downward flow of the diluted mixture through the reaction zone 51 to the enlarged portion 43 of the insert 42, and then upwardly through the perforated wall 46 into the oxygenation zone 53.

Tests are conducted with the pilot plant to evaluate the effect of iron concentration and residence time on the efficiency of hydrogen sulfide removal. Simulated sour water feed is prepared by metering concentrated aqueous sodium sulfide (62,550 ppm sulfide) into a tap water stream to obtain a sulfide ion concentration of about 10 ppm. Non-chelated iron concentrate is prepared containing about 20,000 ppm by weight iron.

Examples of suitable iron concentrates include ferric chloride; ferric nitrate; ferric sulfate and mixtures. Such concentrates have a pH below about 1.5-2.0 to maintain the iron in solution. The simulated sour water is fed to the pilot plant and the iron concentrate is metered into the unit very slowly to obtain a selected iron concentration and residence time while maintaining the iron in solution at the low addition rate and concentration, although the process water is at a near neutral pH. The pilot plant tests are conducted at varying iron concentrations and residence times. The sulfide content of the inlet sour water and the outlet product is measured to determine the sulfide removal efficiency.

These tests will show that successful operation with a hydrogen sulfide removal efficiency of at least about 90% is readily obtained. For the configuration and size of the pilot plant unit, it is concluded that optimum results are obtained at a residence time of about 34 minutes and an iron concentration of from about 1 to about 3 ppm.

EXAMPLE II

A commercial unit for processing a sour water stream from a food plant is designed using an autocirculation system as illustrated in FIG. 1. The design basis and the selected design criteria are shown in Table 1.

TABLE I

| Design Basis | |
| --- | --- |
| Sour Water Source | Effluent Scrubber |
| Liquid Flow Rate (GPM) | 933 |
| Liquid Temperature (°F.) | 95 |
| Liquid Composition | |
| H$_2$S ppm | 84.1 |
| pH | 7 |
| Spent Air Outlet (PSIG) | 0.5 |

TABLE I-continued

| | |
| --- | --- |
| Effluent Sulfide Concentration ppm | 0.5 |
| Sulfide Removal Efficiency (%) | 99.4 |
| Design Criteria | |
| Iron Concentration ppm | 1.0 |
| Solution Circulation Rate (GPM) | 78,516 |
| Solution Temperature (°F.) | 95 |
| Oxidizer Air (SCFM) | 1039 |

A material balance for the process is shown in Table 2. The various streams are identified by the same reference numerals used in FIG. 1.

TABLE 2

| | Stream No. | | | | | |
| --- | --- | --- | --- | --- | --- | --- |
| | 19 | 33 | 26 | 23 | 32 | 38 |
| | Stream Name | | | | | |
| | Sour Water In | Sweet Water Out | Blower Inlet | Oxidizer Air In | Spent Air Out | Replacement Iron Addition |
| H$_2$O | 25942.20 | 25940.18 | 5.31 | 5.31 | 9.10 | 0.628 |
| S$^=$ | 1.23 | 0.007 | — | — | — | — |
| S$^0$ | — | 1.20 | — | — | — | — |
| Fe | — | 0.008 | — | — | — | 0.009 |
| N$_2$ | — | — | 125.73 | 125.73 | 125.73 | — |
| O$_2$ | — | — | 33.42 | 33.42 | 32.79 | — |
| S$_2$O$_3^=$ | — | 0.012 | — | — | — | — |
| Total | 25943.43 | 25941.41 | 164.46 | 164.46 | 167.62 | 0.637 |
| LB/HR | 466999.0 | 466963.0 | 4685.6 | 4685.6 | 4733.4 | 11.8 |
| MW | 18.0 | 18.0 | 28.49 | 28.49 | 28.24 | 18.52 |
| SG | 1.0 | 1.0 | 0.93 | 1.39 | 0.96 | 1.2 |
| SCFM (GPM) | (933) | (932.9) | 1038.855 | 1038.855 | 1058.86 | (0.02) |
| TEMP (°F.) | 95 | 95 | 100 | 197 | 95 | 95 |
| PRESS (PSI) | 10 | 0 | 0 | 11 | 0.5 | 12 |
| MM BTU/HR | 0 | 0.1831 | 0.1053 | 0.2192 | 0.1709 | 0 |

Although the autocirculation apparatus illustrated in FIG. 1 for practicing the process of the invention utilizes a central reaction zone and a surrounding annular oxygenation zone, it will be understood that other configurations and modifications may be used. For example, the autocirculation vessel may contain a pair of concentrically spaced cylindrical partitions defining an annular reaction zone between the partitions and an oxygenation zone comprising a centerwell portion within the innermost partition and an annular portion between the outermost partition and the vessel wall. Other configurations can also be used as disclosed in U.S. Pat. No. 4,238,462.

Although applicable to the treatment of sour water from any source, the invention is particularly effective for the treatment of sour geothermal condensate having a relatively low content of dissolved hydrogen sulfide, e.g., from about 10 ppm to about 500 ppm. The sulfur formed in the process is removed in the sweet condensate as a colloidal suspension of fine sulfur particles which are less likely to cause plugging if the sweet condensate is reinjected into the geothermal formation in the customary manner.

What is claimed is:

1. A continuous process for treating sour water containing from about 5 ppm to about 500 ppm of dissolved hydrogen sulfide within aqueous polyvalent metal solution containing a non-chelated polyvalent metal to effect liquid phase oxidation of dissolved hydrogen sulfide to sulfur by means of dissolved oxygen, wherein said polyvalent metal is reduced from a higher valence state to a lower valence state during said oxidation of hydrogen sulfide to produce a sweet water product, said process comprising:

providing a recirculating system having a reaction zone for said oxidation of hydrogen sulfide and an interconnected oxygenation zone for introducing oxygen into said polyvalent metal solution;

continuously recirculating between said reaction zone and said oxygenation zone a liquid mixture comprising a dilute aqueous solution containing a non-chelated polyvalent metal such that the liquid mixture has a predetermined polyvalent metal ion content selected from the range of from about 0.5 ppm by weight to about 15 ppm by weight;

introducing sour water feed containing from about 5 ppm to about 500 ppm dissolved hydrogen sulfide into an inlet portion of said reaction zone, and mixing and diluting said sour water feed at said inlet portion with at least 2.5 volumes of freshly oxygenated liquid mixture recirculated from said oxygenation zone wherein the liquid mixture has a dissolved oxygen content of at least 1 ppm, and an HS content of less than or equal to 5 ppm to prevent precipitation of ferrous sulfide, where the dissolved oxygen is supplied in at least a stoichiometric amount to the HS content to effect substantially complete oxidation of said sulfide, said mixing and diluting being effected substantially entirely in liquid phase in said reaction zone so that said sour water feed is not contacted with air or gaseous oxygen or a stripping gas capable of stripping dissolved hydrogen sulfide from the liquid mixture until after the sour water has been diluted and has passed through said reaction zone;

introducing air or other oxygen-containing gas into said oxygenation zone, and therein contacting the air or other oxygen-containing gas with said liquid mixture recirculated from said reaction zone under conditions effective to increase the dissolved oxygen content of said liquid mixture and also to oxidize the reduced polyvalent metal to its higher valence state;

withdrawing a minor portion of the oxygenated liquid mixture from said oxygenation zone as the sweet water product of the process, substantially the balance of the oxygenated liquid mixture being recirculated from said oxygenation zone to said reaction zone;

introducing replacement non-chelated polyvalent metal into the system at a rate sufficient to replace that removed in said sweet water product and to maintain said predetermined polyvalent metal ion content in said liquid mixture;

regulating the sour water feed rate and the sweet water product withdrawal rate to provide a predetermined residence time of the sour water in the system selected from the range of from about 5 to about 360 minutes; and correlating said predetermined residence time and said predetermined polyvalent metal ion content so as to obtain substantially complete oxidation of the hydrogen sulfide in the sour water feed to sulfur.

2. The process of claim 1, wherein the sulfur formed by oxidation of said hydrogen sulfide is removed from the system in said sweet water product 3. The process of claim 1, wherein said polyvalent metal is iron.

4. The process of claim 1, wherein said polyvalent metal is iron, and the iron content of said liquid mixture is from about 1 ppm by weight to about 3 ppm by weight.

5. The process of claim 1, wherein said predetermined residence time is from about 15 to about 60 minutes.

6. The process of claim 1, wherein said predeterined residence time and said predetermined polyvalent metal content are correlated so as to obtain a hydrogen sulfide removal efficiency of at least about 90%.

7. The process of claim 1, wherein the volumetric recycle ratio of recirculated liquid mixture to sour water feed is from about 2.5 to 1,000.

8. The process of claim 1, wherein said replacement polyvalent metal is introduced adjacent an outlet portion of said oxygenation zone and is rapidly mixed with said liquid mixture being recirculated from said oxygenation zone to said reaction zone.

9. The process of claim 1, wherein said sweet water product is withdrawn through an overflow extending into an outlet portion of said oxygenation zone.

10. The process of claim 1, wherein said polyvalent metal comprises a ferrous iron salt or a ferric iron salt.

11. The process of claim 10, wherein the iron salt is $FeCl_3$ or $Fe_2(SO_4)_3$.

12. The process of claim 1, wherein said system comprises separate but contiguous reaction and oxygenation zones, said zones being in open fluid communication in a common vessel containing said liquid mixture, and said liquid mixture being recirculated between said zones by reason of the density difference between a higher density, relatively gas-free liquid mixture in said reaction zone and a lower density gas-containing liquid mixture in said oxygenation zone.

* * * * *